UNITED STATES PATENT OFFICE 2,626,939

ALKYDS AND VARNISHES COMPRISING SAME

Harold M. Hoogsteen and Norman R. Peterson, Midland, Mich., assignors to The Dow Chemical Company, Midland, Mich., a corporation of Delaware No Drawing. Application December 27, 1949, Serial No. 135,308

17 Claims. (Cl. 260—22)

This invention concerns certain new alkyds which are suitable for use in varnishes and other coating compositions. It also pertains to varnishes comprising these alkyds.

The alkyds provided by the invention are condensation products of (1) one or more drying oil fatty acids having an average of not more than 35 per cent of their olefinic linkages conjugated with respect to one another, (2) one or more saturated polybasic acids and (3) a mixture of saturated polyhydric alcohols including both an aliphatic polyhydric alcohol having more than three hydroxyl groups in the molecule and an alkylidene-bis-aryloxy alcohol which is dihydric, the alcohols being present (as such or in esterified form) in relative proportions such as to contain an average of from 2.5 to 3.5 oxy groups per alcohol molecule with the alkylidene-bis-aryloxy alcohol in amount providing from 18 to 50 per cent of the oxy groups of all alcohol radicals in the mixture. The oxy groups just referred to correspond to the hydroxyl groups of the free alcohols. Such groups are referred to as oxy, rather than hydroxyl, groups only because a portion of the alcohol mixture may be in esterified form, i. e. the proportions of alcohols stated herein pertain to alcohol radicals and are inclusive of esterified alcohols as well as free alcohols.

The invention pertains more particularly to alkyds having the composition just stated, but wherein the alkylidene-bis-aryloxy alcohol starting material consists of one or more isopropylidene-bis-aryloxy alcohols having the general formula:

$$HO(C_yH_{2y}O-)_n-\underset{X}{\underset{|}{\bigcirc}}-\underset{CH_3}{\overset{CH_3}{\underset{|}{C}}}-\underset{X}{\underset{|}{\bigcirc}}-(-OC_zH_{2z})_{n'}OH$$

wherein X represents hydrogen or the phenyl radical, n and n' individually represent one of the integers 1 and 2, Y and Z individually represent one of the integers 2 and 3. Such isopropylidene-bis-aryloxy alcohols may be prepared by reacting corresponding bis-phenols with alkylene oxides, glycols, polyglycols, or halohydrins in accordance with known procedures. Examples of suitable alkylidene-bis-aryloxy alcohols are:

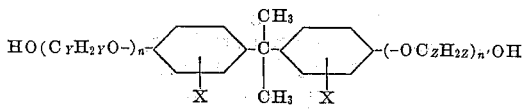

2,2-bis-[para-hydroxyethoxyphenyl]propane

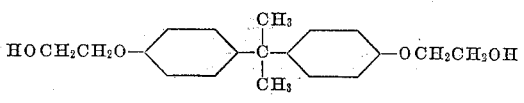

2,2-bis-[para-hydroxyethoxyethoxyphenyl]propane

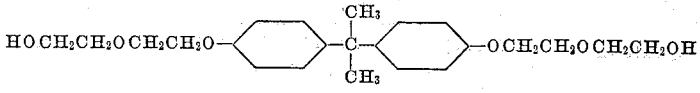

2,2-bis-[para-hydroxypropoxyphenyl]propane $$HOC_3H_6OC_3H_6O-\underset{CH_3}{\overset{CH_3}{\underset{|}{C}}}-OC_3H_6OC_3H_6OH$$

2,2-bis-[para-hydroxypropoxypropoxyphenyl]propane $$HOCH_2CH_2O-\underset{CH_3}{\overset{CH_3}{\underset{|}{C}}}-OCH_2CH_2OH$$
(with biphenyl groups)

2,2-bis-[para-hydroxyethoxybiphenyl]propane and $$HOC_3H_6O-\underset{CH_3}{\overset{CH_3}{\underset{|}{C}}}-OC_3H_6OH$$
(with biphenyl groups)

2,2-bis-[para-hydroxypropoxybiphenyl]propane $$HOC_3H_6O-\underset{CH_3}{\overset{CH_3}{\underset{|}{C}}}-OC_3H_6OC_3H_6OH$$

2-[para-hydroxypropoxyphenyl]-2-[para-hydroxypropoxypropoxyphenyl]propane $$HO-CH_2CH_2O-\underset{CH_3}{\overset{CH_3}{\underset{|}{C}}}-OCH_2CH_2OCH_2CH_2OH$$

2-[para-hydroxyethoxyphenyl]-2-[para-hydroxyethoxyethoxyphenyl]propane

A mixture of two or more such isopropylidene-bis-aryloxy alcohols may be employed in making the alkyds of the invention. The alkylidene-bis-aryloxy alcohol usually employed is a mixture of isomeric 2,2-bis-[para - hydroxypropoxyphenyl] propanes.

The alkyds provided by the invention are liquids when prepared, but readily undergo drying, i. e. solidification and hardening, under exposure to air. They are soluble or compatible with drying oils and with usual varnish solvents such as toluene, xylene, or Solvesso No. 2 (a liquid petroleum fraction comprising aromatic hydrocarbons), etc., and are useful as resin ingredients for the preparation of varnishes, enamels, and other coating compositions. Varnishes, prepared by dissolving the alkyds in usual varnish solvents, spread well and dry quite rapidly to form tack-free, hard, clear films which are fairly flexible and which adhere tightly to the supporting surface, e. g. of wood, or metal, etc., on which they are formed. The dried films of these alkyds are satisfactorily resistant to the solvent action of usual organic liquids such as gasoline, kerosene, benzene, or mineral lubricating oils, etc., and are exceptionally resistant to loosening from the supporting surfaces during washing, e. g. with aqueous solutions of soap or alkalies. However, the dried film may be removed by extensive treatment with usual varnish removers when desired, e. g. for purpose of refinishing the base member.

Any drying oils, or drying oil fatty acids, or mixture thereof may be employed in preparing the alkyds of the invention, provided that not more than 35 per cent of the total number of olefinic linkages of the same are conjugated with respect to one another. The per cent of the total number of olefinic linkages of a drying oil, or a drying oil fatty acid, which are conjugated is frequently termed, and is hereinafter referred to as, the "degree of conjugation" of the oil or acid. A drying oil, or drying oil fatty acid, having a degree of conjugation greater than 35 per cent, gives rise to extensive cross-linking between polymer molecules during use in preparation of alkyds, and is not well suited for use in making the alkyds of this invention. However, such highly conjugated drying oil, or drying oil acid may be used in admixture with a drying oil or drying oil acid of lower degree of conjugation, provided this mixture has a degree of conjugation not greater than 35 per cent, in making the alkyds of the invention. Examples of drying oils and drying oil acids which may be employed are linseed oil, soybean oil, dehydrated castor oil, coconut oil, fish oils of less than 35 per cent conjugation, mixtures of such drying oils with one another and/or with a more highly conjugated drying oil such as tung oil or oiticica oil, provided the resultant drying oil mixture has a degree of conjugation not greater than 35 per cent, unsaturated aliphatic acids (herein termed fatty acids) derived from any of the above-mentioned drying oils having a degree of conjugation of less than 35 per cent, and mixtures of fatty acids derived from any of the drying oils just mentioned, provided such mixture has a degree of conjugation not greater than 35 per cent. Linseed oil, or soybean oil, or a mixture thereof, is preferably employed in making the alkyds of the invention.

Any saturated polycarboxylic acid, free of other readily reactive groups, or an anhydride thereof, may be used as a starting material in making the alkyds, but phthalic acid, or phthalic anhydride, is usually employed. Examples of other polybasic acids which may be employed, as such or in the form of anhydrides, in making the alkyds are sebacic acid, oxalic acid, succinic acid, etc. Aromatic carboxylic acids and anhydrides are referred to herein as saturated, since they do not contain any olefinic or acetylenic linkage and aromatic nuclei are often regarded as saturated. Dicarboxylic acids, or their anhydrides, are preferably employed.

Although any saturated aliphatic polyhydric alcohol having more than two carbon atoms in the molecule may be employed, together with one or more of the aforementioned alkylidene-bis-aryloxy alcohols in making the alkyds of the invention, pentaerythritol, or a mixture of pentaerythritol and glycerine or a glyceride, e. g. a drying oil, is usually employed. A portion, or all of the alcohols, may be esterified with one or more of the aforementioned carboxylic acids, prior to carrying out the reaction for formation of the alkyd. Regardless of whether the alcohols are employed as such, or in esterified condition, they are used in relative proportions such as to contain an average of from 2.5 to 3.5, and preferably from 2.8 to 3.2, oxy groups (corresponding to the hydroxyl groups of the free alcohols) per alcohol radical. The alkylidene-bis-aryloxy alcohol is in a proportion such as to account for from 18 to 50 per cent, and preferably from 25 to 45 per cent, of all of the oxy groups of the alcohols and/or alcohol radicals.

The saturated polycarboxylic acid, or acids, are employed, as such or as anhydrides or esters thereof, in amount such as to provide at least 65 per cent, e. g. from 65 to 80, and preferably from 65 to 70, per cent of the total number of carboxy groups of the mixture of carboxylic acids, carboxylic acid anhydrides, or carboxylic acid esters. A drying oil is usually employed in the starting mixture, but is not required. When employed, a drying oil is present in amount not exceeding 50 per cent of the combined weight of the several reactants. This limitation applies, regardless of whether a drying oil be added as such, or in the form of glycerine and drying oil acids capable of reacting together to form a drying oil.

The mixture of polyhydric alcohols is used in amount providing at least one oxy (or hydroxyl) group thereof per carboxylic acid radical. In practice the alcohols are usually employed in amount exceeding by at least 5 per cent, e. g. by from 10 to 20 per cent, the proportion theoretically required for complete esterification of all of the carboxylic acids in the mixture.

The above-mentioned starting materials, in the relative proportions just stated, may be admixed with one another and reacted together in any of several orders. For instance, drying oils of less than 35 per cent conjugation are usually employed directly as a starting material, but in place of such glycerides, the drying oil acids may be used either in free form or esterified with any other of the polyhydric alcohol starting materials hereinbefore mentioned. The phthalic acid, phthalic anhydride, or other saturated polycarboxylic acid starting material may also be used in free form, or may be partially esterified with one or more of the polyhydric alcohols prior to being employed in the reaction for formation of the alkyd. In practice, we usually heat the drying oil together with the polyhydric alcohol containing more than three hydroxyl groups in the molecule and, if desired, one or more of the polyhydric alcohols, e. g. with pentaerythritol, or a mixture of the latter and 2,2 - bis - [parahydroxypropoxyphenyl]propane, to effect ester-exchange reactions and cause formation of esters of the drying oil acids with the several kinds of polyhydric alcohols present and then add the polybasic acid, or anhydride, and continue the reaction to form the alkyd product.

The esterification reactions involved in preparation of the alkyd are usually carried out at temperatures in the order of from 200° to 250° C., but they may be accomplished at lower, or at somewhat higher, temperatures if desired. Temperatures high enough to cause objectionable darkening of the product are preferably avoided. The reactions to form the alkyd are usually carried out in the absence of catalysts, but usual esterification catalysts such as strong acids or alkalies may be employed.

It may be mentioned that within the aforementioned ranges of proportions of the several starting materials to be used in making the alkyds, an increase in the proportion of the alkylidene-bis-aryloxy alcohol, relative to the other polyhydric alcohol, or alcohols, present, has an effect of reducing the proportion of drying oil, or drying oil acids, which must be present in order to avoid gelation during the reaction to form the alkyd; but of also lowering somewhat the reaction temperature at which darkening occurs during formation of the alkyd. When employing the several starting materials in the preferred proportions hereinbefore given, the reaction is advantageously carried out at temperatures of from 200° to 230° C. Care is usually taken to avoid free and unlimited contact of air with the reacting mixture, since this may cause some darkening of the product, but complete exclusion of air is not necessary. The reaction may be carried out in a closed vessel, e. g. a bomb or autoclave, but is usually accomplished at atmospheric pressure or thereabout in a vessel provided with a reflux condenser so as to permit vaporization from the mixture of water as it is formed. An inert gas such as nitrogen or carbon dioxide may be fed into the reaction vessel to displace air therefrom.

The mixture is usually sampled from time to time during the reaction and its acidity determined. The acidity decreases rapidly in the early stages of the reaction and more gradually as the reaction continues. When a stage is reached at which the acidity changes very gradually with continued heating, or remains substantially constant, the reaction is considered complete. The time of heating for formation of the alkyd is usually in the order of from 5 to 10 hours, but longer heating may sometimes be required.

The alkyd is obtained as a pale-yellow, or light reddish-yellow, liquid, depending on the purity of the starting materials, the reaction temperatures employed, and the care taken to avoid free access of air during preparation of the same. During storage or shipment it should be in closed containers, since it undergoes drying, with resultant solidification and hardening, upon prolonged exposure to air. It may be applied directly to surfaces of wood, or metals, etc., and be dried to obtain a protective coating, but is unduly viscous for convenient application in usual ways. Accordingly, it is advantageously diluted to a desired consistency, e. g. suitable for brushing, dipping, or spraying, with a usual varnish solvent such as toluene, xylene, or Solvesso No. 2 (a liquid petroleum fraction comprising aromatic hydrocarbons), etc., and the resultant varnish is applied as a coating composition. Varnishes having good brushing characteristics usually comprise from 40 to 60 per cent by weight of the alkyd, but varnishes can be prepared of lower or higher concentrations. Pigments may be admixed with such varnish to obtain enamels. When applied to a solid surface, e. g. of wood, or metal, etc., the varnish, or enamel, dries quite rapidly to form a fairly flexible, hard, tack-free film which adheres well to the supporting surface, is satisfactorily resistant to the solvent action of usual organic liquids such as benzene, toluene, gasoline, or mineral oil, etc., and is exceptionally resistant to loosening from the supporting member during washing with aqueous solutions of soaps or alkalies. It has been observed that as the proportion of alkylidene-bis-aryloxy alcohol in the mixtures employed for preparation of the alkyds is increased within the limits hereinbefore stated, such resistance to loosening from a supporting member during washing of dried films of the resultant resins also increases. It is evident, therefore, that the wash-resistance of protective films of the alkyds is due, to a considerable extent, to the alkylidene-bis-aryloxy alcohol chemically combined therein.

The following examples describe a number of ways in which the invention has been applied and illustrate certain of its advantages, but are not to be construed as limiting its scope.

EXAMPLE 1

In each of a series of experiments, a mixture of soybean oil, pentaerythritol and approximately 0.1 per cent by weight of calcium oxide was heated with stirring at 230° C. for approximately 1½ hours. The mixture was then cooled to 180° C. and predetermined amounts of phthalic anhydride and, in most instances, 2,2-bis-[para-hydroxypropoxyphenyl]propane were added, although the latter was omitted in certain of the experiments. Approximately 8 per cent by weight of xylene was also added to thin the mixture and facilitate distillation of water formed in the reaction. The mixture was heated under reflux with stirring for about six hours with gradual raising of its temperature from 190° to 230° C. during this period. In one experiment, wherein the 2,2 - bis - [para-hydroxypropoxyphenyl]propane was omitted, the mixture gelled prior to completion of the reaction and the gel which was formed was insoluble in varnish solvents and therefore unsuited for use in making a varnish. When gelation occurred, this experiment was discontinued. Each of the other experiments were contained as follows. Water formed in the reaction and half or more of the xylene distilled from the reaction mixture during the heating. The product was then cooled and diluted with 20 per cent by weight of Solvesso No. 2 (a liquid petroleum fraction containing more than 90 per cent by weight of aromatic hydrocarbons such as toluene, xylene, etc., and boiling at from 132° to 177° C. at atmospheric pressure). A paint drier consisting of lead and cobalt naphthenates and containing, in chemically combined form, 0.4 per cent of lead and 0.04 per cent of cobalt, based on the weight of the above-described alkyd condensation product, was added. The resultant varnish was clear and of uniform appearance. The varnish was tested by dipping panels of glass and of tin in the same, removing the panels and allowing the varnish films to dry and cure at room temperature. From time to time a finger was pressed against the varnish layer and withdrawn. The minutes of standing after application of the varnish film until the latter did not string out on withdrawing the finger is given in the following table as the time of drying to touch. At intervals of 2 days and 7 days after application of the varnish to the panels, the varnish coating on a glass panel was tested for hardness by the Sward Rocker method described on pages 296–300 of the eighth edition of Gardner's book "Paints, Varnishes, Lacquers and Colors," published in 1937 by the Institute of Paint and Varnish Research, Washington, D. C. Approximately three days after being varnished, a glass plate was immersed in Troluoil (a petroleum fraction rich in aliphatic hydrocarbons and boiling over a range of from 94° to about 122° C.). At intervals the panel was inspected to see whether varnish had separated from the glass plate and, if not, the varnish layer was stroked gently with the finger to see if this would cause separation of the varnish from the plate. The varnish films of all of the experiments remained firmly attached to the panels throughout 48 hours of testing under the conditions just stated. Seven days after being varnished, tin panels were tested for flexibility by being bent over a conical mandrel, in accordance with the procedure described in A. S. T. M. D522–41, and inspected for development of cracks in the varnish. Films of all of the varnishes of this example withstood the test without development of cracks. Two days after being varnished, glass plates were tested for alkali-resistance by treatment with an aqueous sodium hydroxide solution of 2 per cent concentration in accordance with a test method described in A. S. T. M. D154–43. The time of treatment necessary to cause cracking or disintegration of a varnish film, or loosening of the varnish film from a glass plate on which it was formed was observed and serves as a measure of the alkali-resistance of the varnish. Certain of the varnishes were far more resistant than others to the disintegrating or loosening effect of alkali. The results of such tests indicate the relative resistance of the varnish films not only to alkali, but in a general way to other aqueous liquids such as water, or soap solutions, etc. The relative proportions of soybean oil, pentaerythritol, 2,2-bis-[para-hydroxypropoxyphenyl]propane, and phthalic anhydride employed in making each alkyd is given, in terms of per cent by weight, in the following table. The table also expresses the relative proportions of the several polyhydric alcohols, contained, as such or in esterified form, in the starting mixture in terms of the per cent of the total oxy groups of all of the alcohols which is provided by each. The table includes the aforementioned Sward hardness and alkali-resistance values for varnish films produced from the respective alkyd products. In the table, phthalic anhydride, soybean oil, glycerine (chemically combined in the soybean oil), and pentaerythritol are abbreviated as "Phth. Anh.," "SO," "Glycer." and "Pentaeryth," respectively, and 2,2-bis-[para-hydroxypropoxyphenyl]propane is referred to as "bisalc."

In the above table, runs 1–4 describe alkyds outside the scope of the invention and are presented for comparison with runs 5–9 which illustrate practice of the invention. Runs 1, 2 and 3 were made without employment of an alkylidene-bis-aryloxy alcohol in the starting mixture. Dried films of varnish made from the alkyds of runs 1 and 2 had poor alkali-resistance, i. e. they were rapidly loosened from a supporting surface by the action of aqueous alkali. The reaction mixture of run 3 gelled during formation of an alkyd. Dried film of a varnish prepared from the alkyd of run 4 also displayed poor alkali-resistance. The mixture employed in making this alkyd contained 56 per cent of a drying oil, whereas the invention requires use of not more than 50 per cent of drying oil in the starting mixture. Dried films of the varnishes of runs 5–9 all displayed excellent alkali-resistance. Runs 7 and 8 were carried out under similar conditions and are both presented for purpose of demonstrating that consistent results are obtained on repeating an experiment of the invention.

EXAMPLE 2

An alkyd was prepared from 40 parts by weight of soybean oil, 28.9 parts of phthalic anhydride, 21 parts of 2,2-bis-[para-hydroxyethoxyphenyl]propane and 10.1 parts of pentaerythritol. The following are the proportions of the total oxy content of the alcohols and esters in the starting materials that are provided by the respective alcohols and alcohol radicals in the starting materials: glycerine (of the soybean oil), 24.6%; pentaerythritol, 53.4%; and 2,2-bis-[para-hydroxyethoxyphenyl]propane, 22%. Except for employment of 2,2-bis-[para-hydroxyethxoyphenyl]propane instead of 2,2-bis-[para-hydroxypropoxyphenyl]propane as a starting material, the procedure in making the alkyd, and the varnish, and in testing the latter was as described in Example 1. The alkyd was used in making a varnish and the latter was tested by procedure similar to that described in Example 1. The varnish prepared from the alkyd was clear, of uniform appearance and, after being applied to the test panels, dried to touch in 35 minutes. The Sward hardness of the varnish film was 22 per cent after 24 hours of drying and 30 per cent after 7 days of drying. The varnish film had good flexibility and withstood the aqueous alkali wash test for 5 hours without becoming loosened from a panel on which it was formed.

EXAMPLE 3

An alkyd was prepared from approximately 400 parts by weight of soybean oil, 274 parts of phthalic anhydride, 101 parts of pentaerythritol, and 225 parts of 2-[parahydroxypropoxyphenyl] - 2 - [para - hydroxypropoxypropoxyphenyl]-

*Table I*

| Run No. | Starting Materials, Wt. Percent | | | | Percent of oxy groups of alcohols supplied by— | | | Varnish Film | | | |
|---|---|---|---|---|---|---|---|---|---|---|---|
| | Phth. Anh. | SO | Pentaeryth. | Bisalc. | Glycer. | Pentaeryth. | Bisalc. | Drying to Touch, Minutes | Percent Hardness After— | | Alkali Resistance |
| | | | | | | | | | 24 Hrs. | 7 days | |
| 1 | 22.2 | 66.6 | 11.2 | 0 | 41 | 59 | 0 | 150 | 5 | 8 | 3 min. |
| 2 | 28.5 | 57.0 | 14.5 | 0 | 31.4 | 68.6 | 0 | 35 | 18 | 25 | 9 min. |
| 3 | 32.4 | 50.0 | 17.6 | 0 | 22.6 | 77.4 | 0 | Reaction Mixture Gelled | | | |
| 4 | 23.1 | 56.0 | 9.4 | 11.5 | 35.8 | 51.7 | 12.5 | 150 | 6 | 11 | 10 min. |
| 5 | 28.4 | 48.0 | 12.1 | 11.5 | 28.4 | 60.0 | 11.6 | 40 | 18 | 26 | 2 hrs. |
| 6 | 23.6 | 50.0 | 8.4 | 18.0 | 32.7 | 47.3 | 20.0 | 90 | 7 | 13 | 3 hrs. |
| 7 | 28.3 | 40.0 | 10.1 | 21.6 | 24.4 | 53.2 | 22.4 | 35 | 24 | 30 | 5 hrs. |
| 8 | 28.3 | 40.0 | 10.1 | 21.6 | 24.4 | 53.2 | 22.4 | 35 | 20 | 28 | 5 hrs. |
| 9 | 24.1 | 44.0 | 7.4 | 24.5 | 29.5 | 42.5 | 2800 | 80 | 12 | 22 | 4 hrs. | propane. The latter was prepared by reacting three molecular equivalents of propylene oxide with one mole of bis-phenol, i. e. 2,2-bis-[para-hydroxyphenyl]propane, in the presence of a condensation catalyst in accordance with known procedure. The alkyd was prepared, subsequently used in making a varnish and the varnish was tested, all by procedure similar to that described in Example 1. The varnish was clear and homogeneous in appearance. After being applied to test plates it dried to touch in 2 hours. The varnish film had a Sward hardness value of 9 per cent after 16 hours of drying in contact with air at room temperature. In the alkali-resistance test, it withstood the action of the aqueous sodium hydroxide solution for 2½ hours without cracking, disintegrating, or becoming loosened from the panel on which the film was formed.

EXAMPLE 4

Procedure similar to that described in Example 1 was applied in making an alkyd from approximately 400 parts by weight of soybean oil, 271 parts of phthalic anhydride, 101 parts of pentaerythritol and 228 parts of 2,2-bis-[para-hydroxypropoxypropoxyphenyl]propane; in preparing a varnish from the alkyd; and in testing the varnish. The 2,2-bis-[para-hydroxypropoxypropoxyphenyl]propane starting material was prepared by reacting four molecular equivalents of propylene oxide with one mol of 2,2-bis-[para-hydroxyphenyl]propane in the presence of a condensation catalyst in accordance with known procedure. The alkyd, when prepared, was not entirely homogeneous, i. e. it tended to stratify into layers on standing, but it was soluble in Solvesso No. 2 to form a clear varnish. The varnish, when applied as films on test plates, dried to touch in 90 minutes. After 16 hours of air drying at room temperature, the varnish film had a Sward hardness value of 6 per cent. In the alkali resistance test, the dried varnish film withstood the action of the aqueous sodium hydroxide solution for 2 hours without cracking, disintegrating, or becoming loosened from the panel on which it was formed.

EXAMPLE 5

An alkyd was prepared by heating a mixture of 280 parts by weight of soybean oil acids (i. e. the higher unsaturated aliphatic acids obtained by hydrolysis of soybean oil) and 195 parts of 2,2-bis-[para-hydroxypropoxyphenyl]propane to 160° C. in contact with a protective atmosphere of carbon dioxide, adding 76 parts of pentaerythritol, heating the mixture with stirring and in contact with carbon dioxide to 200° C. in 45 minutes, and maintaining the mixture at said temperature for 15 minutes. Approximately 148 parts of phthalic anhydride and 25 parts of xylene were then added and the mixture was heated with stirring in contact with the carbon dioxide to 235° C. and maintained at said temperature until a one gram test portion of the product had an acidity such as to neutralize 0.014 gram of potassium hydroxide. About 7 hours of heating was required to reach this acidity value after addition of the phthalic anhydride. The alkyd thus prepared was clear and uniform in appearance. It was used in making a varnish and the latter was tested as in Example 1. After application as films on test plates, the varnish dried to touch in 2 hours. At the end of 24 hours of air drying at room temperature, the varnish film had a Sward hardness value of 20 per cent. In the alkali resistance test, a dried film of the varnish withstood the action of the aqueous sodium hydroxide solution for more than two days without developing cracks, or disintegrating, or becoming loosened from the panel on which it was formed.

EXAMPLE 6

The experiment of Example 5 was repeated, except that 280 parts by weight of linseed oil acids (i. e. the higher unsaturated aliphatic monocarboxylic acids obtained by hydrolysis of linseed oil) instead of soybean oil acids were employed in making the alkyd and that the reaction to form the alkyd was carried to a point at which a one gram test portion of the product had an acidity such as to neutralize 0.0128 gram of potassium hydroxide. The alkyd product was clear and uniform in appearance. The varnish prepared therefrom dried to touch in 135 minutes after being applied as coatings on test plates. After 3 days of drying at room temperature in contact with air, the varnish film had a Sward hardness value of 24 per cent. The varnish film which had been dried for the time and under the conditions just stated withstood action of the aqueous sodium hydroxide solution for 8 hours without cracking, disintegrating, or becoming loosened from the panel on which it was formed.

EXAMPLE 7

An alkyd was prepared from 200 parts by weight of soybean oil, 131.6 parts of phthalic anhydride, 118 parts of 2,2-bis[para-hydroxypropoxy-ortho-phenyl-phenyl]propane, and 50.5 parts of pentaerythritol. The alkyd was prepared and subsequently used in making a varnish, and the varnish was tested, all by procedure similar to that described in Example 1. The Sward hardness of the varnish film was 34 per cent after 3 days of drying at room temperature in contact with air. The varnish film dried for the time and under the conditions just stated withstood action of the aqueous sodium hydroxide solution for 8 hours without cracking, disintegrating, or becoming loosened from the panel on which it was formed.

The term "drying oil" as employed herein carries its usual meaning of pertaining to triglycerides of unsaturated higher aliphatic monocarboxylic acids, and does not pertain to other organic liquids having drying properties.

Other modes of applying the principle of the invention may be employed instead of those explained, change being made as regards the method or products herein disclosed, provided the steps or ingredients stated by any of the following claims or the equivalent of such stated steps or ingredients be employed.

We therefore particularly point out and distinctly claim as our invention:

1. A method of making an alkyd which comprises reacting together an alkylidene-bis-aryloxy alcohol having the general formula:—

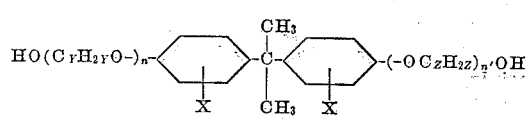

wherein X represents a member of the group consisting of hydrogen and the phenyl radical, $n$ and $n'$ individually represent one of the integers 1 and 2, Y and Z individually represent integers of from 2 to 3, at least one saturated aliphatic polyhydric alcohol including such alcohol having more than three oxy groups attached to a single hydrocarbon radical of the molecule, a member of the group consisting of saturated polycarboxylic acids and their anhydrides, and at least one member of the group consisting of drying oils having a degree of conjugation not greater than 35 per cent and corresponding drying oil acids, the member of the group consisting of saturated polycarboxylic acids and their anhydrides being in a proportion providing from 65 to 80 per cent of all carboxy radicals of the reacting materials, the polyhydric alcohols being present in amount at least as great as that theoretically required for complete esterification of all of the carboxylic acids in the mixture, the alkylidene-bis-aryloxy alcohol being in a proportion such as to provide from 18 to 50 per cent of all of the oxy groups of the polyhydric alcohols and esters thereof in the mixture, and any drying oil present being in amount not greater than 50 per cent of the combined weight of the starting materials just mentioned.

2. A method, as claimed in claim 1, wherein the alkylidene-bis-aryloxy alcohol is 2,2-bis-[para - hydroxypropoxyphenyl1]propane, the polyhydric alcohol containing more than 3 oxy groups in the molecule is pentaerythritol, the member of the group consisting of saturated polycarboxylic acids and their anhydrides is phthalic anhydride, and a member of the group consisting of drying oils having a degree of conjugation not greater than 35 per cent and the corresponding drying oil acids is soybean oil.

3. A method, as claimed in claim 2, wherein the phthalic anhydride is in amount providing from 65 to 70 per cent of all carboxy radicals in the reacting materials.

4. A method, as claimed in claim 1, wherein the alkylidene-bis-aryloxy alcohol is 2,2-bis-[para-hydroxypropoxy-ortho - phenyl - phenyl] propane, the polyhydric alcohol containing more than 3 oxy groups in the molecule is pentaerythritol, the member of the group consisting of saturated polycarboxylic acids and their anhydrides is phthalic anhydride, and the member of the group consisting of drying oils having a degree of conjugation not greater than 35 per cent and the corresponding drying oil acids is soybean oil, and the phthalic anhydride is in amount providing from 65 to 70 per cent of all carboxy radicals in the reacting materials.

5. A method, as claimed in claim 1, wherein the alkylidene-bis-aryloxy alcohol is 2-[para-hydroxypropoxyphenyl] - 2 - [para - hydroxypropoxypropoxyphenyl]propane, the polyhydric alcohol containing more than 3 oxy groups in the molecule is pentaerythritol, the member of the group consisting of saturated polycarboxylic acids and their anhydrides is phthalic anhydride, and the member of the group consisting of drying oils having a degree of conjugation not greater than 35 per cent and the corresponding drying oil acids is soybean oil, and the phthalic anhydride is in amount providing from 65 to 70 per cent of all carboxy radicals in the reacting materials.

6. A method, as claimed in claim 1, wherein the member of the group consisting of drying oils having a degree of conjugation not greater than 35 per cent and the corresponding drying oil acids is soybean oil acids.

7. A method, as claimed in claim 1, wherein the member of the group consisting of drying oils having a degree of conjugation not greater than 35 per cent and the corresponding drying oil acids is linseed oil acids.

8. An alkyd consisting essentially of a condensation product of at least one alkylidene-bis-aryloxy alcohol having the general formula:—

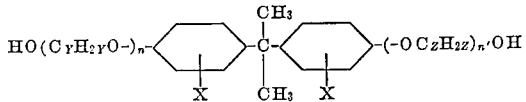

wherein X represents a member of the group consisting of hydrogen and the phenyl radical, $n$ and $n'$ individually represent one of the integers 1 and 2, and Y and Z individually represent one of the integers 2 and 3, at least one saturated aliphatic polyhydric alcohol having more than three hydroxyl groups in the molecule, at least one saturated polycarboxylic acid, and at least one member of the group consisting of drying oils having a degree of conjugation not greater than 35 per cent and corresponding drying oil acids, chemically combined with one another in proportions such that polycarboxylic acid radicals are in amount providing from 65 to 80 per cent of all carboxy groups of the alkyd, polyhydric alcohol radicals are in amount at least as great as that theoretically required for complete esterification of the carboxylic acids, the alkylidene-bis-aryloxy alcohol provides from 18 to 50 per cent of all of the oxy groups of all of the polyhydric alcohols, and the alkyd contains not more than 50 per cent by weight of a drying oil chemically combined therein.

9. An alkyd, as claimed in claim 8, wherein the alkylidene-bis-aryloxy alcohol is 2,2-bis-[para-hydroxypropoxyphenyl]propane, the alcohol having more than 3 oxy groups in the molecule is pentaerythritol, the saturated polycarboxylic acid is phthalic acid, and the member of the group consisting of drying oils having a degree of conjugation of less than 35 per cent and corresponding drying oil acids is soybean oil.

10. A varnish consisting essentially of a solution of an alkyd of claim 9 in an organic liquid.

11. An alkyd, as claimed in claim 9, containing phthalic acid radicals in amount providing from 65 to 70 per cent of all carboxy groups in the alkyd.

12. A varnish consisting essentially of a solution of an alkyd of claim 11 in an organic liquid.

13. An alkyd, as claimed in claim 8, wherein the alkylidene-bis-aryloxy alcohol is 2,2-bis-[para - hydroxypropoxy - ortho-phenyl-phenyl]-propane, the alcohol having more than 3 oxy groups in the molecule is pentaerythritol, and the saturated polycarboxylic acid is phthalic acid.

14. An alkyd, as claimed in claim 8, wherein the alkylidene-bis-aryloxy alcohol is 2-[para-hydroxypropoxy - phenyl] - 2 - [para-hydroxypropoxypropoxyphenyl]propane, the alcohol having more than 3 oxy groups in the molecule is pentaerythritol, and the saturated polycarboxylic acid is phthalic acid.

15. An alkyd, as claimed in claim 8, wherein the member of the group consisting of drying oils having a degree of conjugation not greater than 35 per cent and corresponding drying oil acids is soybean oil acids.

16. An alkyd, as claimed in claim 8, wherein the member of the group consisting of drying oils having a degree of conjugation not greater than 35 per cent and corresponding drying oil acids is linseed oil acids.

17. A varnish consisting essentially of a solution of an alkyd of claim 8 in an organic liquid.

HAROLD M. HOOGSTEEN.
NORMAN R. PETERSON.

REFERENCES CITED

The following references are of record in the file of this patent:

UNITED STATES PATENTS

| Number | Name | Date |
|---|---|---|
| 1,667,189 | Burke et al. | Apr. 24, 1928 |
| 2,437,046 | Rothrock Jr., et al. | Mar. 2, 1948 |
| 2,504,518 | Greenlee | Apr. 18, 1950 |

OTHER REFERENCES

Phillips, Chemistry & Industry, Jan. 3, 1948.